May 14, 1935.    J. W. AKERS    2,001,406
PORTABLE ELECTRIC LAMP
Filed May 25, 1934
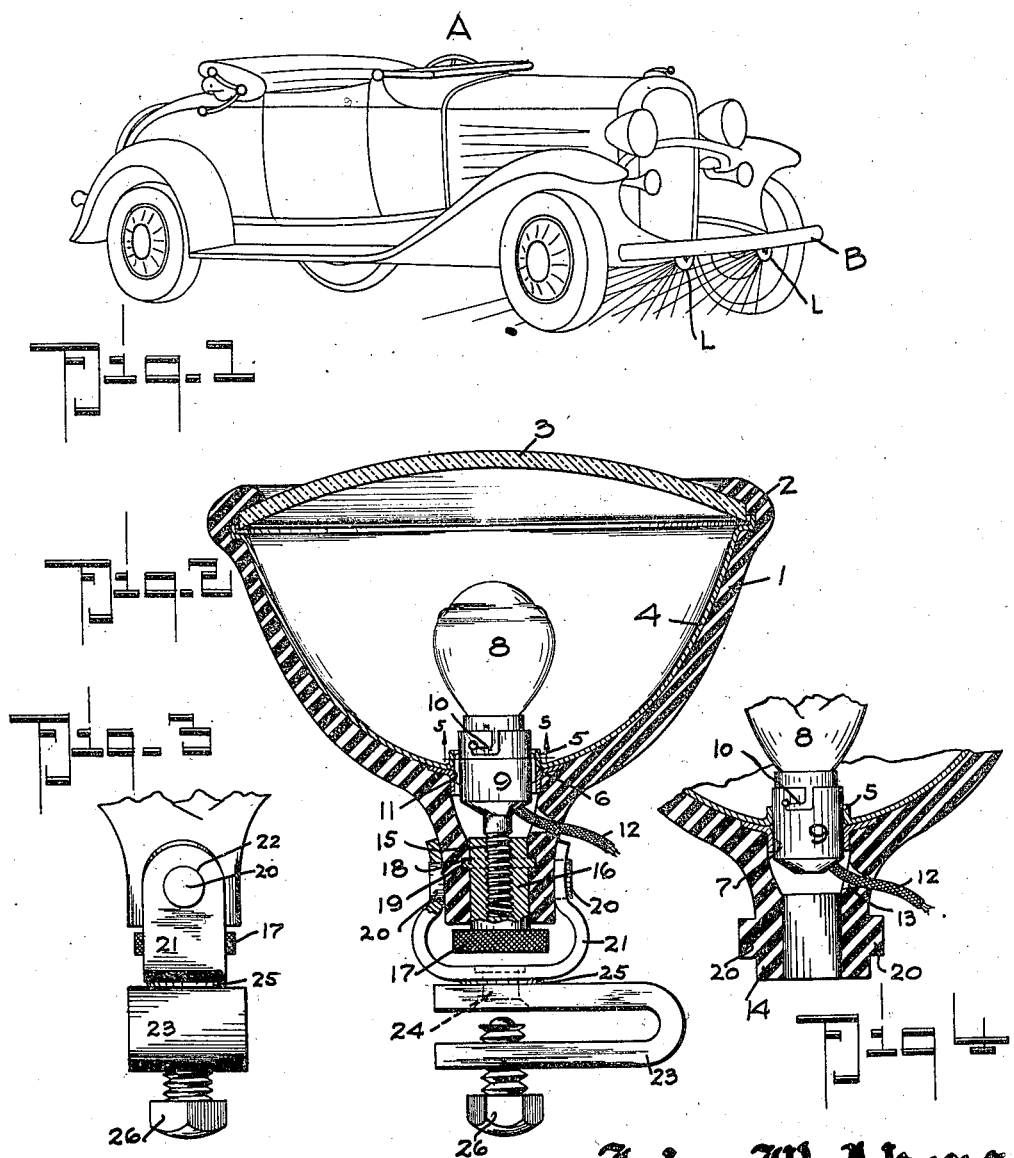
John W. Akers
Inventor Patented May 14, 1935

2,001,406

UNITED STATES PATENT OFFICE 2,001,406

PORTABLE ELECTRIC LAMP

John W. Akers, Clarkston, Wash.

Application May 25, 1934, Serial No. 727,423

2 Claims. (Cl. 240—41)

My present invention relates to an improved portable electric lamp which, while capable of use in various relations, is especially adapted for use as an accessory for automotive vehicles. In the exemplification of the invention in the drawing the lamp is intended for connection in suitable manner with the electrical system of an automotive vehicle, and, as a hand-lamp, it is equipped with an adequate length of wire or cord to permit access to the various parts of the vehicle, as for instance, when seeking the cause of trouble at night.

The lamp is also equipped with fastening means for attachment to various parts of the vehicle, for use as a stationary illuminator, which is adjustable for various traffic uses and purposes.

In order to render the lamp durable and capable of withstanding the usual rough handling and usage of such devices, I provide a flexible, resilient casing for the lamp structure, and the invention consists essentially in certain novel combinations and arrangements of parts involving this casing and other features of construction as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention. It will be understood, however that the drawing illustrates an exemplifying structure, and that various changes and alterations may be made therein, within the scope of my claims, without departing from the principles of my invention.

Figure 1 is a perspective view of a standard type of automotive vehicle, which is equipped with a pair of lamps embodying my invention, and used to illuminate the understructure of the vehicle and the roadway beneath the vehicle.

Figure 2 is a sectional view of the lamp, as a whole, with some parts in elevation.

Figure 3 is a detail view of the attaching device or fastening means, as seen from the right in Figure 2.

Figure 4 is a detail sectional view showing the manner of mounting the lamp-bulb and its socket in the casing of the lamp, the light-focusing means being omitted for convenience of illustration.

Figure 5 is a transverse sectional view at line 5—5 of Figure 2 illustrating the mode of securing the lamp and its socket in the lamp casing.

In order to illustrate one mode of using the invention I have shown a pair of lamps as L, L, in Figure 1, attached to the bumper B of the automobile A, and performing the functions of illuminating the under portions of the vehicle and the roadway beneath the vehicle and adjacent thereto, for the benefit of an approaching motorist. It will be understood that one or more lamps may be attached to other parts of the vehicle, as desired for illuminating purposes, and to prevent accidents.

The lamp, which is indicated as a whole by the letter L in Figure 1, is fashioned with a protective casing 1, which may be of rubber, or other flexible and resilient material which will act as a cushion against hard knocks and rough usage to which an implement of this character is subjected.

The casing is fashioned with an inturned, annular flange 2, which forms the retaining ring for the circular lens 3 of the lamp, and the casing forms an enclosure for the usual metal reflector 4. The thickness of the casing is ample to provide the necessary body-covering for the reflector, and the latter possesses the required rigidity to maintain the shape of the casing, while the flange or retaining ring 2, due to its resiliency or elasticity, insures a dust-tight and weather-tight rim for the lamp.

At its rear, the reflector is fashioned with a central opening surrounded by an inturned, annular flange 5, which, as best seen in Figure 5 is fashioned with a pair of diametrically arranged, exterior, beads 6 which provide inner grooves in the flange. A flanged sleeve 7 is welded to the exterior of the reflector to form a continuation of the flange 5, and the beads 6 may extend along this sleeve to give length to the grooves formed thereby.

The lamp-bulb 8 is of any suitable type, and it is fitted into its cylindrical socket 9 and fastened therein by means of a bayonet lock, indicated at 10. The cylindrical socket is fashioned with a pair of exterior ribs 11, and these ribs are adapted to slide into the guide grooves 6 of the reflector-sleeve to hold the bulb and the socket in the socket-sleeve against turning therein.

The lamp bulb and its socket are thus held against turning in the reflector and casing, and the usual wire or cord 12 for the bulb enters a hole 13 in the neck 14 of the casing to supply current for the bulb from a suitable source, usually the battery of the electrical system of the automobile.

The neck 14, which is a reduced, integral, extension of the casing, is of cylindrical shape, and adapted to receive the socket-sleeve 7 of the reflector, and within this neck is enclosed a screw 15 that is rigidly secured to the back or rear portion of the lamp socket. A rotatable, but non-traveling nut 16 is also enclosed within the neck of the casing and adapted to receive the threads of the screw 15. The non-traveling nut is fashioned with a knurled head 17 that is readily accessible, and it is also provided with an annular flange 18 that fits in a complementary groove 19 in the inner face of the neck. The nut and screw are provided for the purpose of focusing the bulb within the reflector, and it will be apparent that by turning the nut, the screw will be advanced toward or away from the reflector, for the purpose of adjusting the bulb in desired relation to the reflector.

The lamp as thus described may be employed as a hand-lamp and carried, within the limitations of the length of the cord or wire 12, to desired locations about the automotive vehicle, for various uses.

For the purpose of attaching the lamp or lamps, and using them as stationary illuminators, in and around the vehicle, as in Figure 1, I employ attaching or fastening means, with which the lamp may readily be connected to or disconnected from various parts of the vehicle.

For carrying out this purpose, the neck of the casing is fashioned with a pair of diametrically arranged, exterior bosses or trunnions 20, 20, and I provide a U-shaped, spring yoke 21 which has holes 22 therein to fit over the trunnions, thereby permitting the lamp and its casing to swing on the trunnions as an axis.

A U-shaped attaching clamp 23 has one of its legs pivoted at 24 to the yoke, in a plane at right angles to the axis of the trunnions, and a friction washer 25 is interposed between the yoke and the clamp. Thus the yoke may be turned on the clamp with the pivot 24 as a center, and the lamp may then be turned in the yoke with the trunnions as a center. These parts thus form a universal joint that permits a wide range of adjustment for the lamp. By means of a clamp bolt 26 threaded in the other leg of the U-clamp 23, the clamp may be firmly attached to a suitable part of the vehicle or its frame, for the support of the lamp.

The lamp as thus constructed is comparatively inexpensive in cost of manufacture, the parts may with facility be assembled, and with equal facility the assembled parts may be dissociated for purposes of repairs or replacements, and the device provides a proficient instrumentality for the proper performance of its required functions.

Having thus fully described my invention, what I claim as new and desire to secure by Letters Patent is:—

1. The combination in an electric lamp with a reflector and a socket sleeve rigid therewith, a casing for the reflector and a resilient neck carried by the casing, of a lamp and its socket, said socket having a pair of exterior, longitudinally extending ribs fitted in and slidable in a pair of complementary grooves of the socket sleeve, a screw rigid with and extending rearwardly from the socket, a threaded nut on the screw within the neck, an exterior retaining ring on the nut engaged in a complementary groove in the neck, and an operating-head on the nut at the rear end of the neck.

2. The combination in an electric lamp with a reflector, an adjustable socket supported in the reflector, a lamp in the socket and a screw rigid with the socket, of a casing for the reflector and a neck on the casing having exterior trunnions, a U-shaped spring yoke having holes for the trunnions and a pivotal support for the yoke, a nut mounted on the screw having an exterior annular retaining ring engaging a groove in the neck, and an operating head on said screw located within the yoke.

JOHN W. AKERS.